2,728,755
ETHYLENE POLYMERIZATION PROCESS

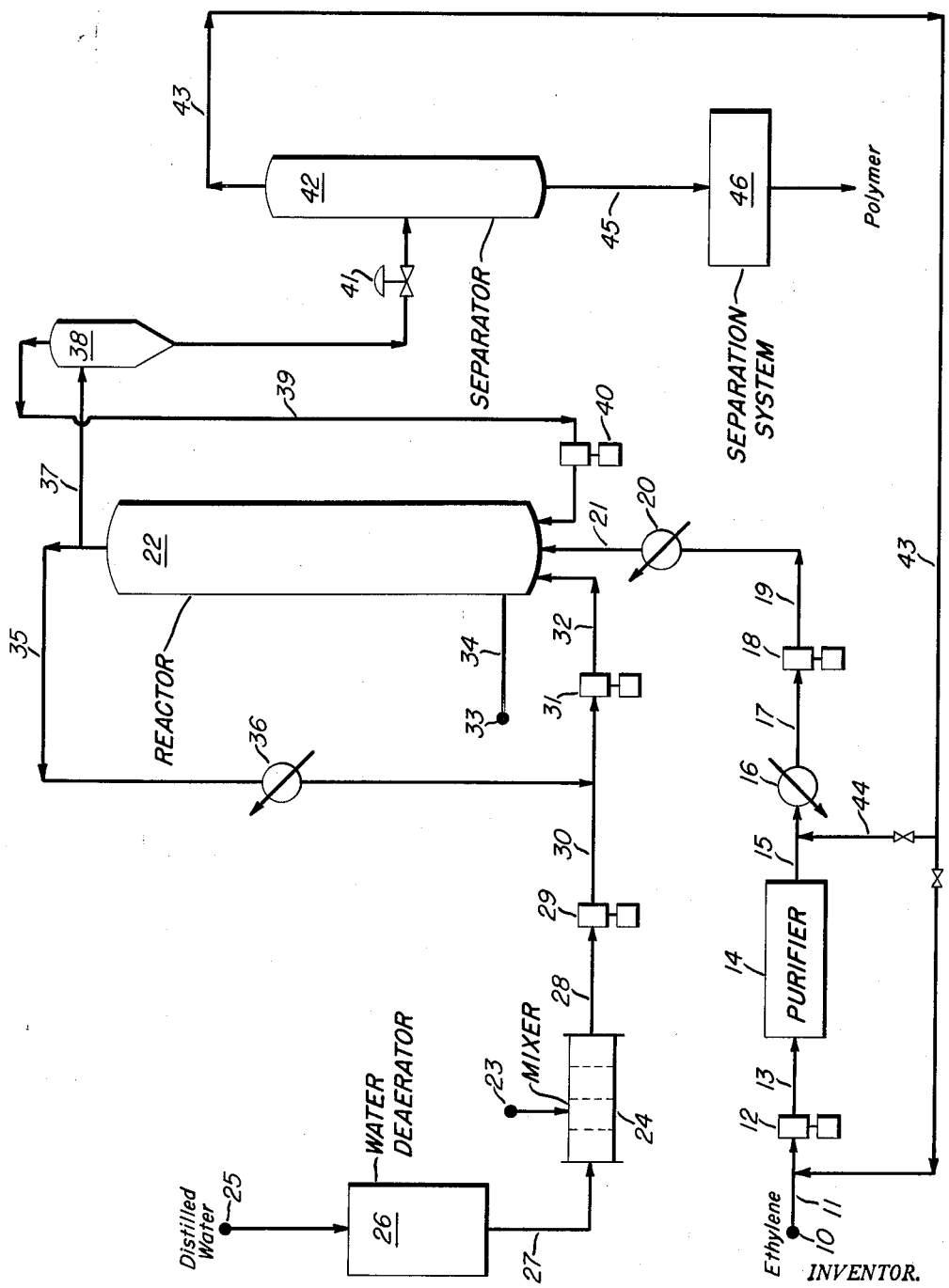

Gert H. Weisemann, Hobart, Ind., assignor to Standard Oil Company, Chicago, Ill., a corporation of Indiana Application May 21, 1952, Serial No. 289,119

7 Claims. (Cl. 260—94.9)

This invention relates to an improved process of polymerizing ethylene to produce solid, high-molecular-weight polyethylene. The invention has particular reference to an improved ethylene polymerization process employing as a catalyst peroxydicarbonate esters (also termed diformate peroxides or dioxydiformates) having the general formula

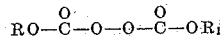

wherein R and $R_1$ are organic radicals, especially alkyl radicals. The polymerization of ethylene in the presence of peroxydicarbonate esters is described in U. S. Patents 2,475,628; 2,475,643; and 2,475,648.

A primary object of this invention is the provision of improvements in an ethylene polymerization process employing the above catalyst and a product carrier liquid that is present in separate phase during polymerization whereby there is produced a polyethylene of uniform, improved quality. Another object of the invention is the provision of an improved ethylene polymerization process, employing the above catalyst, in which a carrier liquid is provided to carry ethylene polymer from the reaction zone, the carrier liquid neither acting as a solvent nor forming an emulsion in the reaction zone and therefore being readily separable, along with extracted product, from unreacted ethylene and catalyst.

Another object of the invention is the provision of an improved process of polymerizing ethylene to obtain normally solid polymers in the presence of a substantial volume of a product-carrier liquid whereby deposition of polymer on reactor walls or other equipment is substantially completely avoided. Yet another object of the invention is the provision of a two-phase ethylene polymerization system in which polymerization occurs in a dense gaseous ethylene phase whereby a polyethylene of uniform, unimpaired high quality is produced, and in which polyethylene transfers as a dispersion into a separate carrier phase and is thereby readily carried from the reactor. A further object of this invention is the provision of a process of ethylene polymerization in the presence of a product-carrier liquid in which the said liquid is so conditioned as to prevent substantial interference with product quality. The invention has for other objects such other advantages or results as will be found in the ensuing description and claims.

This invention comprises the catalytic polymerization of ethylene in a discrete dense gaseous phase of ethylene dispersed by constant agitation in a separate water-surfactant phase that is present in a weight between 25 and 90 percent of the total weight of the reaction mixture and contains in solution between 0.005 and 1.0 percent, by weight of the total aqueous phase, of a surface active agent. It is essential to maintain the relative volume of the aqueous phase within the above limits to provide a normally solid polyethylene of uniform high quality. It is, in addition, essential to effective polymerization that not more than about 20 percent by weight of polyethylene based on the weight of the total aqueous slurry of polymer be permitted to accumulate in the slurry in order that the slurried polymer can be readily removed from the reactor.

In carrying out the process of this invention, ethylene is polymerized in the presence of a peroxydicarbonate ester catalyst and in the presence, as a separate phase, of the said aqueous solution of surfactant, under pressures between about 4,000 and 20,000 pounds per square inch gauge and at temperatures between about 30° and 100° C. and preferably between about 55° and about 90° C. The catalyst is introduced into the reaction zone either in undiluted form or in solution in an organic solvent or water, preferably in quantities of 0.01 to 1.0 weight percent of catalyst based on the weight of ethylene contacted. It is essential that the reaction system be continuously agitated so as to provide a thorough intermixing of the ethylene in the aqueous phase because the ethylene phase is not dispersed in finely divided form as an emulsion in the aqueous phase and no stable dispersion of the two phases is obtained. The ethylene phase can be either the continuous phase or the discontinuous phase. This agitation is preferably accomplished by providing a recycle of reactor contents; recirculation in the range of 0.2 to 2 reactor volumes per minute depending on the size of the reactor will provide adequate intermixing of these phases. A portion of the intermixed phases is continuously withdrawn and immediately released to a relatively low pressure zone wherein excess ethylene is flashed from the mixture. A slurry of the polymer in the aqueous solution of surfactant is separated by the flash evaporation of ethylene and is delivered to drying, washing, filtering, and similar product separation means. The polymer slurry can contain as high as about 20 percent by weight of polyethylene based on the weight of the slurry, and for ease in handling will preferably be no higher than about 15 percent by weight, concentrations of polymer in slurry about this latter figure constituting extremely heavy pastes.

The aqueous solution of surfactant preferably constitutes an aqueous solution of a detergent of the class prepared by the alkylation etherification and/or sulfonation of phenols and aromatic hydrocarbons in which the detergent is present in a concentration between about 0.005 and 1.0 percent, and preferably between 0.05 and 0.2 percent, by weight based on the total weight of the aqueous phase. The preferred upper limit of 0.2 weight percent is established by the facts that large amounts of surfactant are difficult to remove from the polymer and that no great benefit of wetting the polymer, or in providing ease of removal of the polymer from the reaction zone, appears to be gained above about the said concentration of 0.2 weight percent. Examples of detergents found especially useful in the process are condensation products of ethylene oxide and an alkylated phenol, sulfonated products of an alkylated benzene, and condensation products of ethylene oxide and propylene glycol.

The relative volume of water-surfactant phase with respect to the total reaction volume that includes also the dense gas ethylene phase must also be maintained within limits to provide the improved polyethylene product. Between 25 and 90 percent of the total weight of the reaction mixture can be the aqueous solution of detergent. In other words, between about 25 and 90 weight percent of the feed to the reactor should be the aqueous phase. It is suggested merely as a theory that relative weights of aqueous phase greater than 90 percent of the total permit the solution of excessive quantities of the catalyst in the aqueous phase, thereby diluting the ethylene phase with regard to catalyst concentration. Difficulty is encountered in removing polymer from the reactor when relative volumes of the aqueous phase of less than 25 percent are employed, and use of smaller amounts entails the additional disadvantage of providing only a limited capacity as a carrier for polyethylene.

In the accompanying drawing, the single figure is a flow diagram illustrating schematically the process of the present invention in which an external recycle is employed to provide agitation and mixing of the two-phase system and in which a preferred means of admixing the said phases is employed wherein the ethylene phase is the discontinuous phase.

In the process as illustrated with specific reference to the drawing, commercial ethylene is delivered from a source 10 through a line 11 and is pumped by a compressor 12 through a line 13 into a purifier 14 wherein ethylene is treated to reduce its oxygen content to less than about 10 parts by weight per million. Treatment in purifier 14 preferably constitutes passing the ethylene at a pressure of about 1,000 pounds per square inch gauge and at a temperature in the range of 150° to 200° C. over a bed of reduced copper oxide. Purified ethylene leaves purifier 14 and passes through line 15 and cooler 16 in which the ethylene is cooled to a temperature of about −15° C. The liquified and purified ethylene flows from cooler 16 through line 17 and is pumped by a pump 18 through a line 19 and a preheater 20 and is passed at a pressure of about 15,000 pounds per square inch gauge and a temperature between about 55° and 100° C. through a line 21 into the bottom of reactor 22.

A surfactant such, for example, as a water-soluble anionic detergent that is a sulfonated ether of polyethylene glycols (Igepal) is added from a source 23 to water in a mixing tank 24. The water in the mixing tank 24 is delivered thereto from a source of distilled water 25 and a deaerator means 26 through a line 27.

Water containing surfactant at a concentration preferably between about 0.05 and 0.2 percent by weight of the water is delivered from the mixing tank 24 through a line 28 and pump 29 into line 30. The aqueous solution is pumped by a recycle pump 31 from the line 30 through a line 32 and thence into the bottom of the reactor 22. The aqueous solution of surfactant is pumped by the said pump 31 into the reactor under a pressure of about 15,000 pounds per square inch gauge.

Diethyl peroxydicarbonate catalyst which is stored at a temperature of below 0° C., is delivered from a source 33 through a line 34 into the said reactor 22 at a rate of about .0001 to .005 pound of catalyst per pound of ethylene.

The reactor 22, which can comprise a plurality of vertically disposed reactor tubes, can also contain internal cooling means, not shown, to extract heat from the exothermic polymerization reaction. The reaction mixture which consists essentially of ethylene, an aqueous solution of surfactant, catalyst, and polyethylene, is continuously agitated to maintain an effective dispersion of the ethylene throughout the reaction mixture, since neither a solution nor an emulsion of the ethylene in the aqueous phase is formed.

The constituents of the reaction mixture are preferably added so that a continuous phase of aqueous solution of surfactant is maintained in the reactor. It has been observed that ethylene polymerization takes place in the ethylene phase. Consequently, it is important to wet the dispersed units of dense phase ethylene and prevent the deposition of polymer therefrom upon reactor walls or cooling apparatus or like equipment. Upon formation of polymer the major part thereof transfers as a dispersion, either as a suspension or solution, into the water phase, and since the described continuous aqueous phase surrounds each globule of dense ethylene, the polyethylene can be carried from the reactor 22.

The described disposition of phases in the reactor, whereby the aqueous phase is the enveloping continuous phase therein, permits effective employment of concentrations of surfactant as low as 0.005 percent of the total weight of aqueous phase. As aforementioned, the use of lower quantities of surfactant within the disclosed range is preferred.

The reaction mixture, which includes the mixed phases, the catalyst, and product, is withdrawn from reactor 22 through line 35 and is recycled at reaction pressure by the said pump 31 through the line 35, cooler 36 disposed therein (to maintain uniform polymerization temperature) and line 32 into the reactor. This recycle of total reaction mixture is considered to be internal recycle since it constitutes in fact a portion of the polymerization zone.

A portion of the said reaction mixture is withdrawn from the reactor 22 on line 35 and flows through a line 37 to a cyclone separator 38 from which separated ethylene phase, after only slight loss of pressure, may be returned by line 39 and pump 40 to the reactor.

The amount of total reactor effluent which is withdrawn from the system to separator 38 will be dependent on the nature of the catalyst conversion conditions, etc., and will be selected to prevent the stream recycled through line 35 from becoming too viscous, i. e., from containing more than 15 to 30 percent of product polymer. Preferably about 3 to 30 or about 10 parts of reactor effluent are recycled through line 35 for each part withdrawn through line 37.

Unseparated ethylene phase and aqueous slurry of polymer are passed through a pressure reducing valve 41 for reducing the pressure to between atmospheric and 1000 p. s. i. g. The mixture then flows into a low pressure separator 42 at the substantially reduced pressure. Ethylene flashes from the reaction mixture, at the said low pressure in separator 42, and flows therefrom through a line 43 to line 11 and ethylene compressor 12. The process of polymerization effects a marked purification of the ethylene which passes through the reaction zone, and this separated ethylene can consequently be effectively recycled (external recycle) to the reactor 22 by flowing the same from line 43 through a valved line 44 into the line 15.

A slurry of aqueous solution of surfactant and product is withdrawn from the low pressure separator 42 through a line 45 and is delivered to product separating means 46 which preferably includes means for washing the water and surfactant from the product and subsequent means for drying the polyethylene. It has been found particularly advantageous in all cases, and essential when upper-limit concentrations of surfactant are employed, to wash the polyethylene product while maintaining it at softening temperature. The semi-molten polyethylene is kneaded in rolls while being washed with a forced stream of water or other solvent. Polyethylene polymer having an average molecular weight in the range of about 10,000 to 50,000 is withdrawn from the product separating means 44 and is thereafter treated in conventional drying, milling, and other refining means not shown.

The process as above described with reference to the drawing provides a discontinuous dispersed ethylene phase in water in the ratio of preferably about 40 parts by weight of ethylene to 60 parts by weight of water, although this ratio can vary from about 10 parts by weight of ethylene to 90 parts by weight of water, to about 75 parts by weight of ethylene to 25 parts by weight of water. This system provides, even at low relative water quantities, a complete aqueous medium for the polymerization and a large volume of carrier medium for the polyethylene.

The specific viscosity values reported in the specification and following examples as $\eta \times 10^5$ were obtained by employing the Staudinger formula (Phys. Chem. 171, 129 (1934)) using 0.125 gram of polyethylene per 100 ml. of boiling xylene at 85° C. for viscosity measurements.

Example 1

Polymerization of ethylene was performed at a pressure of 10,000 pounds per square inch gauge and at a temperature of 83° C. Ethylene was continuously introduced into the reactor at a rate of 3.7 pounds per hour and water containing 1 percent Igepal (a sulfonated ether of polypropylene-polyethylene glycols) was introduced at a rate of 10.6 pounds per hour. Diethyl peroxydicarbonate was continuously introduced into the reactor at a rate of 0.002 pound per hour. Polymerization was accomplished in the dense ethylene phase and polymer was transferred in the reactor into the aqueous phase. The reaction mixture was continuously recycled during the reaction period. During a selected reaction period of 7 hours, an average yield of 1.28 pounds per hour of ethylene polymer was recovered, this representing a yield of 620 parts of polymer per part of catalyst introduced. The polymer exhibited a specific viscosity of $18,000 \times 10^{-5}$ and film formed from the polymer was tough and flexible. The polymer exhibited good flexibility and extensibility. Polymer having a greater flexibility and extensibility was produced in a similar run operating under a pressure of 13,000 pounds per square inch gauge and at a temperature of about 140° C. The catalyst was introduced into the reactor in a solution of tertiary butanol and this introduction of tertiary butanol produced a concentration of the alcohol in the water of about 4 percent.

Example 2

In this example the aqueous phase contained between about 0.0005 and 0.01 weight percent of Triton, a polyoxyethylene ether of an alkyl phenol. Polymerization was conducted under a pressure of 5000 pounds per square inch and at a temperature of 77° C. for a period of ten hours. 180 gallons of water per hour were recirculated. Diethyl peroxydicarbonate was introduced at a rate of 0.004 pound per hour. Ethylene was fed at a rate slightly more than 2.5 pounds per hour; the ethylene contained less than 8 parts per million of oxygen. A yield of 0.18 pounds of polymer was obtained, from which polyethylene was recovered having a specific viscosity of $12,900 \times 10^{-5}$.

The invention having been described, the following is claimed:

1. In a process of polymerizing ethylene at an elevated temperature and pressure in the presence of a diperoxydicarbonate ester catalyst to form normally solid polyethylene, the improved method of operation comprising: continuously introducing ethylene and, as a separate phase, an aqueous solution of a detergent, in which the concentration of the detergent is between 0.005 and about 0.2 percent by weight of the aqueous solution into the inlet end of a polymerization zone under the said elevated pressure; continuously polymerizing ethylene therein at said elevated temperature in the presence of the ethylene phase, the said aqueous phase constituting 25 to 90 percent by weight of the total reaction mixture; continuously withdrawing reaction mixture comprising said phases from the polymerization zone, subjecting the said mixture to heat interchange to maintain a substantially uniform polymerization temperature, and internally recycling the mixture to the said polymerization zone at a rate sufficient thoroughly to mix the said phases and transfer polymer to the aqueous phase in the polymerization zone; withdrawing another portion of reaction mixture from the polymerization zone; centrifugally separating ethylene phase from aqueous phase of said other portion and returning so-separated ethylene to the polymerization zone; flowing withdrawn effluent from which ethylene has been centrifugally separated to a zone under a pressure substantially lower than the pressure in the polymerization zone and therein separating ethylene from polyethylene and aqueous phase; and recovering polyethylene from the said aqueous phase.

2. The process of claim 1 in which the said other portion of reaction mixture is withdrawn in a ratio of 1 part by weight to between 3 and 30 parts by weight of internally recycled reaction mixture.

3. The process of claim 1 in which polymerization of ethylene is continued until the concentration of polyethylene in the said aqueous phase the said effluent is at most about 20 percent by weight of the total aqueous phase.

4. A process of polymerizing ethylene to form normally solid polyethylene, the said process comprising continuously admixing ethylene and, as a separate phase, from 25 percent to 90 percent, based on the total weight of the mixture, of an aqueous solution containing from 0.05 to 0.2 percent by weight of a detergent of the class selected from the group consisting of sulfonated products of alkylated benzene, and condensation products of ethylene oxide and an alkylated phenol, and ethylene oxide and polypropylene glycol, continuously contacting the reaction mixture throughout a polymerization zone at a temperature between about 55° and 100° C. under a pressure between about 4,000 and 20,000 pounds per square inch gauge in the presence of a diperoxydicarbonate ester having the general formula

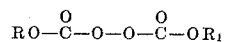

wherein R and $R_1$ are organic radicals to effect polymerization of the ethylene in an ethylene phase, internally recycling the reaction mixture to mutually disperse the phases and to effect transfer of so-formed polyethylene from the ethylene phase into the aqueous phase, continuing the said recycling until the concentration of polyethylene dispersed in the aqueous phase is at most about 20 percent by weight based on the total weight of the aqueous dispersion, then continuously withdrawing reaction mixture at a rate to prevent the polyethylene content of the mixture from exceeding about 20 per cent by weight, and recovering normally solid polyethylene from the said withdrawn mixture.

5. A process of polymerizing ethylene to form normally solid polyethylene, the said process comprising continuously introducing ethylene at a pressure between about 4,000 and 15,000 pounds per square inch gauge into a reaction zone, flowing the ethylene upwardly through the said reaction zone, continuously introducing into the inlet end of the reaction zone an aqueous solution of a detergent selected from the group consisting of sulfonated products of alkylated benzene, and condensation products of ethylene oxide and an alkylated phenol and of ethylene oxide and polypropylene glycol, the detergent being in a concentration from 0.05 to 0.2 percent by weight based on the total weight of the aqueous solution, and flowing said aqueous solution also upwardly to form a continuous aqueous phase in a volume such as to constitute from 25 to 90 percent by weight of the total of the reaction mixture, in which the said ethylene is a discontinuous phase, effecting polymerization of the ethylene at a temperature between about 55° and 100° C. in the presence of the said aqueous phase and between 0.01 and 10.0 percent by weight based on the ethylene of a dialkylperoxydicarbonate having the general formula

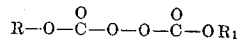

internally recycling reaction mixture at a rate in the range of 0.2 to 2 reactor volume per minute to mix the said phases and transfer so-formed polyethylene to the aqueous phase, continuing said polymerization of ethylene until the concentration of polyethylene in the said aqueous phase is at most about 20 percent by weight of the total aqueous phase, withdrawing another portion of reaction mixture from the reaction zone to a zone of reduced pressure, therein effecting vaporization of unreacted ethylene, cooling residual reaction mixture comprising essentially the said aqueous phase to a temperature substantially lower than reaction temperature, and recovering normally solid polyethylene from the said cooled aqueous phase.

6. The process of claim 5 in which the said other portion of reaction mixture is withdrawn, at a rate of 1 part to between 3 and 30 parts by weight of internally recycled reaction mixture, and is centrifugally separated, so-separated, ethylene phase being returned to the polymerization zone and the remainder passing to the said zone of reduced pressure.

7. In a process of polymerizing ethylene at an elevated temperature and pressure in the presence of a diperoxydicarbonate ester catalyst to form normally solid polyethylene, the improved method of operation which comprises continuously introducing into the inlet end of a polymerization zone ethylene and, as a separate phase, an aqueous solution of a detergent in which the concentration of the detergent is between .005 and .2 per cent by weight based on said aqueous solution, continuously polymerizing ethylene in said zone under polymerization conditions in the presence of the ethylene phase while maintaining an aqueous phase of about 20 to 90 per cent by weight of the total polymerization zone contents, continuously cooling a part of the polymerization zone effluent and internally recycling said part to the polymerization zone for maintaining substantially uniform polymerization temperature and obtaining a mixture of the ethylene phase and aqueous solution whereby polymer formed in the ethylene phase is transferred to the aqueous solution in the polymerization zone, continuously withdrawing another part of the polymerization zone effluent into a zone of reduced pressure, separating ethylene from an aqueous slurry of polyethylene in said zone of reduced pressure and recovering polyethylene from said aqueous slurry.

References Cited in the file of this patent

UNITED STATES PATENTS

| | | |
|---|---|---|
| 2,342,400 | Hopff | Feb. 22, 1944 |
| 2,414,311 | Larson | Jan. 14, 1947 |
| 2,449,489 | Larson | Sept. 14, 1948 |
| 2,542,783 | Seed | Feb. 20, 1951 |